Jan. 21, 1930.  L. D. NIX  1,744,493
SEMIAUTOMATIC WATER SOFTENER
Filed Dec. 23, 1927
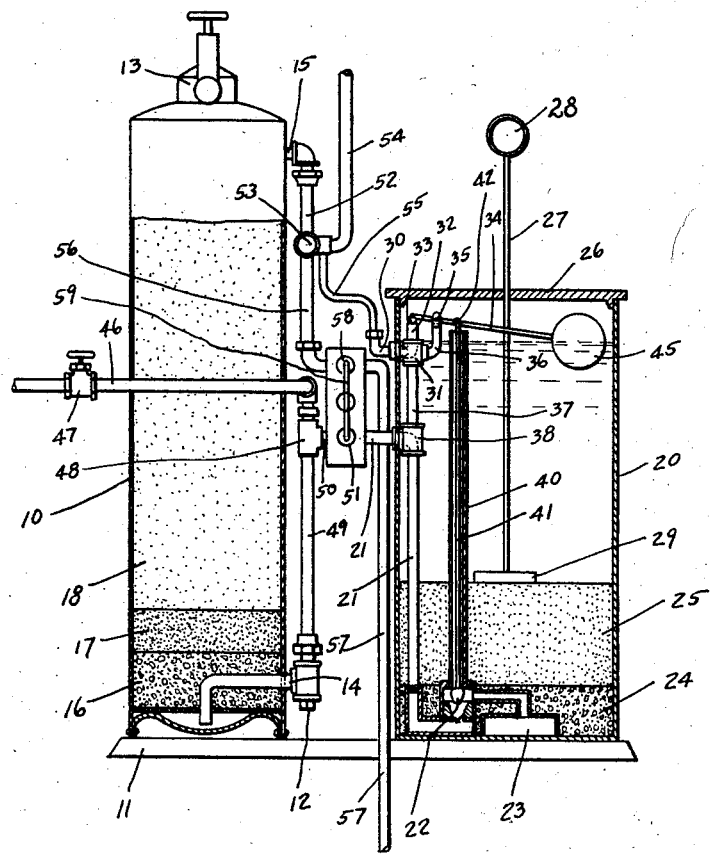
INVENTOR.
LEO D. NIX.
BY
ATTORNEYS.

Patented Jan. 21, 1930

1,744,493

UNITED STATES PATENT OFFICE

LEO D. NIX, OF INDIANAPOLIS, INDIANA, ASSIGNOR TO PURITAN ENGINEERING CORPORATION, OF CRAWFORDSVILLE, INDIANA, A CORPORATION

SEMIAUTOMATIC WATER SOFTENER

Application filed December 23, 1927. Serial No. 242,122.

This invention relates to a water softening apparatus.

The chief object of the invention is to provide an apparatus which is semi-automatic in its operation for regenerating zeolite material in water softeners.

The chief feature of the invention consists in the provision of means which permits drawing off only a predetermined amount of regenerating solution which when it is desired to regenerate, is automatically passed through the water softener and wasted until the solution has been fully utilized, whereupon the water softening apparatus or zeolite bed after regeneration is automatically washed. The apparatus is further designed to provide for the automatic replenishing of the regenerating solution upon the cutting off of the washing operation.

Another feature of the invention consists in the arrangement of the several parts such that they may be simultaneously operable and the provision of a single means for operating the several associated parts.

The full nature of the invention will be understood from the accompanying drawings and the following description and claims:

In the drawings the figure is an elevational view with parts in section illustrating the invention.

In the drawings 10 indicates a vertical water softening tank mounted upon a suitable support 11 provided with a drain-out plug 12 and a detachable head 13. The water softening tank 10 includes an inlet pipe 14 and an outlet pipe 15 positioned respectively near the bottom and top so that the flow of water through the tank will always be upwardly. The tank contains the usual materials for water softening, such as a layer of gravel 16, a layer of zeolite supporting sand 17 and a layer of zeolite 18.

As is well known in the water softening art, the zeolite material, whether natural or artificial, has the property of exchanging its sodium content for the calcium and magnesium content which is the hard water content of the salts contained in hard water. Passage of the hard water through the zeolite results in the exchange of such contents with the result that the water leaves in a softened condition containing substantially only the sodium salt. After sufficient water has passed through the softener it will be apparent that all of the zeolite material will be of calcium and magnesium form. It is customary to regenerate this material since the same has the property of being readily reversible or easily exchanging its base by exchanging the same to a solution, preferably because of cheapness, of common salt. The salt solution changes the zeolite back to the sodium form and the water carrying the salt carries off the calcium and magnesium chloride and this water is wasted. After sufficient regeneration has occurred it is customary to wash the zeolite bed with clean water before using it for household use.

Heretofore the salt solution has been prepared by supplying salt directly to the zeolite tank, by forming a separate chamber in the tank for the salt and passing water therethrough to form a salt solution, or by providing a separate tank containing salt solution.

The present invention is herein shown adapted to the latter type of construction, although by a slight change it may be adapted to a single unit arrangement. The regenerating solution tank 20 includes a discharge line 21 controlled by a valve 22. Said line terminates in a sump 23 positioned in a gravel bed 24 which supports a layer of salt 25. Of the usual character and extending through the top 26 of said tank is a rod 27 carrying a plate 29 at its lower end which is adapted to rest upon the top of the salt layer and indicate the depth of the salt layer contained within the salt regenerating solution tank. When the weight 28 is lowered until approximately immediately above the top 26, the householder knows that it is time to replenish the salt.

An intake 30 discharges through a fitting 31 to an outlet 32 and a valve 33 is carried by a lever 34 pivotally supported at 35 in a stationary support 36 carried by the fitting 31 for convenience and the fitting 31 is supported by an extension 37 of the vertical portion of the discharge line 21 through a blind nipple 37 in T—38. A tube 40 is provided for protecting a rod 41 connected at its upper end at 42 to the lever 34 and at its lower end to a valve 22. A float 45 is carried by the arm or lever 34. The operation of the device is as follows:

Water is supplied through line 30 to the regenerating solution tank 20 until such time as the liquid level raises the float 45 to cause valve 33 to seat in the outlet 32 and cut off further discharge of the water. Upon the solution being withdrawn from line 21, valve 22 being normally open when the float is in the position shown in the figure, the float falls with the fall in liquid level until such time as valve 22 closes when the level reaches that for which the device is adjusted. Further solution, therefore, cannot be withdrawn from the storage tank 20. During the time of withdrawal of the liquid the valve 33, of course, is open but as will be hereinafter pointed out, no liquid is supplied to the intake 30 and thus the solution is not diluted and a saturated solution is assured for regeneration.

The raw water connections and main control are as follows:

The hard water line to the softener is indicated by the numeral 46, and discharges through a fitting 48 to a line 49 that connects directly with the intake 14. The fitting 48 is an ejector of the jet type and leading therefrom is a line 50 which communicates with the discharge line 21 of the regenerating solution tank 20 through a valve indicated diagrammatically at 51 and when the valve 51 is open and water flows from line 46 to and through the water softening tank the ejector action sucks the regenerated liquid solution from the sump 23 and carries it through the zeolite or water softening material and regenerates the same.

The discharge 15 is connected by a line 52 to a fitting 53 which has one branch 54 leading to the household supply and a restricted branch 55 connecting to the intake 30 of the regenerating liquid tank 20. Another branch 56 connects to a waste line 57 by way of a valve 58. The mechanism 59 connects the valves 58 and 51 together such that both valves are opened and closed simultaneously.

The operation is as follows:

After the water softening capacity of the zeolite has been substantially exhausted the mechanism 59 is actuated to open valves 51 and 58. This connects the discharge line 15 of the water softening tank with the waste line 57 and the intake line 49 to the water softening tank in communication with line 21 to discharge line of the regenerating solution tank so that the flow of water through line 49 sucks the solution by means of the ejector arrangement 48 from the tank 20 and causes the same to pass through the tank 10 and waste through the line 57. This discharge will continue automatically until the level of the solution in tank 20 sufficiently falls when the valve 23 is operated to cut off line 21. Additional regenerating solution, therefore, will not be supplied to the tank 10 but the water will continue to flow through the tank 10 and as it passes through it will wash the zeolite material and this wash water will be wasted through line 57. Since line 56 is a waste line of large enough area there will be no back pressure in it when the valve 58 is open. The line 55 connected to it is relatively restricted and when there is no back pressure on the line 56, there is no tendency for water to pass through said line to line 30 and the tank 20. After a suitable washing period the mechanism 59 is actuated to simultaneously close valves 51 and valve 58. Continued flow of water puts pressure on line 52 and supplies soft water to the household supply line 54 and since the line 52 is now under pressure the valve 58 being closed, softened water is supplied by lines 55 and 30 to the tank 20 until such time as the float rises and causes valve 33 to close the outlet 32. If the water is drawn from line 54 the water is supplied to the softening tank by line 46. It will be observed that in the foregoing action the flow of water through the zeolite material is up for softening, for regenerating and for washing.

The invention claimed is:

1. In combination with a water softening chamber containing a zeolite material and including an inlet and a discharge, a regenerating solution containing chamber including an inlet and a discharge, said chambers being connected together for supplying regenerating solution to the softening chamber for regenerating the zeolite material therein, a waste line connected to the water softening chamber discharge, a valve controlling said waste line, said line having sufficient area to prevent the formation of any back pressure in the line when the valve is open, and a normally open connection between the water softening chamber discharge and the other chamber intake and arranged such that water does not pass from the water softening chamber to the regenerating solution chamber when the waste line control valve is open.

2. In combination with a water softening chamber containing zeolite material, including an inlet and a discharge, and a regenerating solution containing chamber including an inlet and discharge, of a pair of connections, each connecting one of said chamber discharges to the other chamber inlet, a waste pipe connected to one connection, a raw water supply pipe connected to the other connection, a soft water supply pipe communicating with the water softening chamber discharge, control means between said chambers for softening, regenerating and washing, a valve in the regenerating solution chamber for controlling the discharge therefrom, a second valve therein mechanically connected with said first valve for controlling the inlet thereto, and a float mechanically connected with each of said valves and controlled by the level of the water in said chamber for actuating said valves to permit only the discharge of a predetermined amount of regenerating solution from the second-mentioned to the first-mentioned chamber.

3. In combination with a water softening chamber containing zeolite material, including an inlet and discharge, and a regenerating solution containing chamber including an inlet at the top thereof and a discharge at the bottom thereof, of a pair of connections, each connecting one of said chamber discharges to the other chamber inlet, a waste pipe connected to the other connection, a valve housing in said second-mentioned chamber communicating with the discharge, a tube extending upwardly from said housing, a control valve in said housing, a valve rod extending upwardly through said tube, a valve for controlling the inlet, and a float connected with said inlet valve and valve rod, said tube having its open end above the water level for preventing water from passing directly into said valve housing, whereby said float will actuate said valves for controlling the quantity of regenerating fluid discharged from said chamber.

In witness whereof, I have hereunto affixed my signature.

LEO D. NIX.